US012487623B2

(12) United States Patent
Rizzo

(10) Patent No.: US 12,487,623 B2
(45) Date of Patent: Dec. 2, 2025

(54) VOLTAGE REGULATOR CIRCUIT AND CORRESPONDING DEVICE

(71) Applicant: STMicroelectronics S.r.l., Agrate Brianza (IT)

(72) Inventor: Alessandro Rizzo, Syracuse (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 153 days.

(21) Appl. No.: 18/462,997

(22) Filed: Sep. 7, 2023

(65) Prior Publication Data

US 2024/0126316 A1 Apr. 18, 2024

(30) Foreign Application Priority Data

Oct. 6, 2022 (IT) ........................ 102022000020610

(51) Int. Cl.
*G05F 1/575* (2006.01)
*G05F 1/46* (2006.01)
*G05F 3/26* (2006.01)

(52) U.S. Cl.
CPC .............. *G05F 1/575* (2013.01); *G05F 1/468* (2013.01); *G05F 3/262* (2013.01)

(58) Field of Classification Search
CPC . G05F 1/575; G05F 1/56; G05F 1/562; G05F 1/563; G05F 1/565; G05F 1/569; G05F 1/571; G05F 1/573; G05F 1/5735; G05F 1/59; G05F 1/468; G05F 1/46; G05F 3/262; G05F 3/26; G05F 3/20
See application file for complete search history.

(56) References Cited

U.S. PATENT DOCUMENTS 10,915,132 B1 2/2021 Liu
2013/0328615 A1* 12/2013 Sano ....................... G05F 1/463 327/513
2014/0070788 A1* 3/2014 Pottbaecker ............. G05F 3/30 323/313

(Continued)

OTHER PUBLICATIONS

Rincon-Mora, Gabriel Alfonso, "Voltage References: From Diodes to Precision High-Order Bandgap Circuits," Voltage References, Chapter 3, Oct. 25, 2001, 17 pages.

(Continued)

*Primary Examiner* — Nguyen Tran
(74) *Attorney, Agent, or Firm* — Slater Matsil LLP

(57) ABSTRACT

A circuit includes a supply node receiving a supply voltage; an output node providing a regulated voltage; startup circuitry coupled to the supply node; current generator circuitry coupled to the startup circuitry and producing a current; a bandgap node coupled to bandgap circuitry to receive a bandgap voltage; multiplier circuitry coupled to the bandgap node and the current generator circuitry to receive and apply scaling to the current; a first transistor providing a threshold voltage drop across the first and second transistor nodes; a first resistive element interposed between the first transistor and the bandgap node; a second resistive element coupled between ground and the second node of the first transistor; and an operational amplifier receiving a pre-regulated voltage as a function of the bandgap voltage, the threshold voltage across the first transistor, and a voltage drop across the first and second resistive elements.

20 Claims, 11 Drawing Sheets

(56) References Cited

U.S. PATENT DOCUMENTS

2023/0122458 A1 * 4/2023 Zhang .................... G05F 3/262
323/280

OTHER PUBLICATIONS

Serdijn, W.A., et al., "Analog IC Techniques for Low-Voltage Low Power Electronics," TUDelft, Section 4.3.4, Dec. 31, 1995, https://repository.tudelft.nl/islandora/object/uuid%3Ab5d556b4-253d-4492-a526-ef363e1e3f91, 243 pages.
Texas Instruments, "TPS746 1-A High Accuracy Adjustable LDO with Power-Good in a Small Size Package", SBVs337A, Apr. 2018, 35 pages.
Texas Instruments, "TPS7B82-Q1 Automotive 300-mA, High-Voltage, Ultra-Low-IQ Low-Dropout Regulator," TPS7B82-Q1, Sep. 2017, 35 pages.

* cited by examiner

VOLTAGE REGULATOR CIRCUIT AND CORRESPONDING DEVICE

CROSS-REFERENCE TO RELATED APPLICATIONS

This application claims the benefit of Italian Patent Application No. 102022000020610, filed on Oct. 6, 2022, which application is hereby incorporated herein by reference.

TECHNICAL FIELD

The description relates to voltage regulator circuits and methods.

One or more embodiments may be applied to scale down input voltage for low voltage sensitive circuitry, such as bandgap circuits, operational amplifier circuits and digital circuits, for instance.

BACKGROUND

In a low quiescent, high voltage low-dropout regulator (LDO), a nano power pre-regulator with ultra-low quiescent current at zero load is desirable.

For instance, its quiescent current consumption (currently referred to as shutdown current) can represent a relevant portion of the total current of the LDO, in particular in off mode (for instance, when an enable signal EN is at a first logic level, such as logic level “0”).

In medium and high voltage applications, a pre-regulator can be used to scale down input voltage and to bias precise low voltage load circuitry, such as bandgap, operational amplifiers, undervoltage lockout, comparators, PLL, digital parts with thousands of gates or more.

In order to reduce the bias current, silicon area reduction is desirable.

Known architectures to reduce the bias current involve several circuits and components, such as Zener diodes, consistent resistors, current generators, and the like, with a relevant impact on the area footprint.

SUMMARY

An object of one or more embodiments is to contribute in overcoming the aforementioned drawbacks.

According to one or more embodiments, that object can be achieved via a circuit having the features set forth in the claims that follow.

One or more embodiments may relate to a corresponding voltage regulator device.

The claims are an integral part of the technical teaching provided herein with reference to the embodiments.

One or more embodiments facilitate reducing an area footprint of the circuitry.

In one or more embodiments, a high input voltage pre-regulator involves low quiescent consumption.

One or more embodiments provide a more compact solution.

One or more embodiments use a reduced number of resistors and electronic components.

One or more embodiments facilitate saving silicon area and power consumption.

BRIEF DESCRIPTION OF THE DRAWINGS

One or more embodiments will now be described, by way of non-limiting example only, with reference to the annexed Figures, wherein.

Corresponding numerals and symbols in the different figures generally refer to corresponding parts unless otherwise indicated.

The figures are drawn to clearly illustrate the relevant aspects of the embodiments and are not necessarily drawn to scale.

The edges of features drawn in the figures do not necessarily indicate the termination of the extent of the feature.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to “an embodiment” or “one embodiment” in the framework of the present description is intended to indicate that a particular configuration, structure, or characteristic described in relation to the embodiment is comprised in at least one embodiment. Hence, phrases such as “in an embodiment” or “in one embodiment” that may be present in one or more points of the present description do not necessarily refer to one and the same embodiment.

Moreover, particular conformations, structures, or characteristics may be combined in any adequate way in one or more embodiments.

The drawings are in simplified form and are not to precise scale.

Throughout the figures annexed herein, like parts or elements are indicated with like references/numerals unless the context indicates otherwise, and for brevity a corresponding description will not be repeated for each and every figure.

The references used herein are provided merely for convenience and hence do not define the extent of protection or the scope of the embodiments.

For the sake of simplicity, in the following detailed description a same reference symbol may be used to designate both a node/line in a circuit and a signal which may occur at that node or line.

Figure 1:
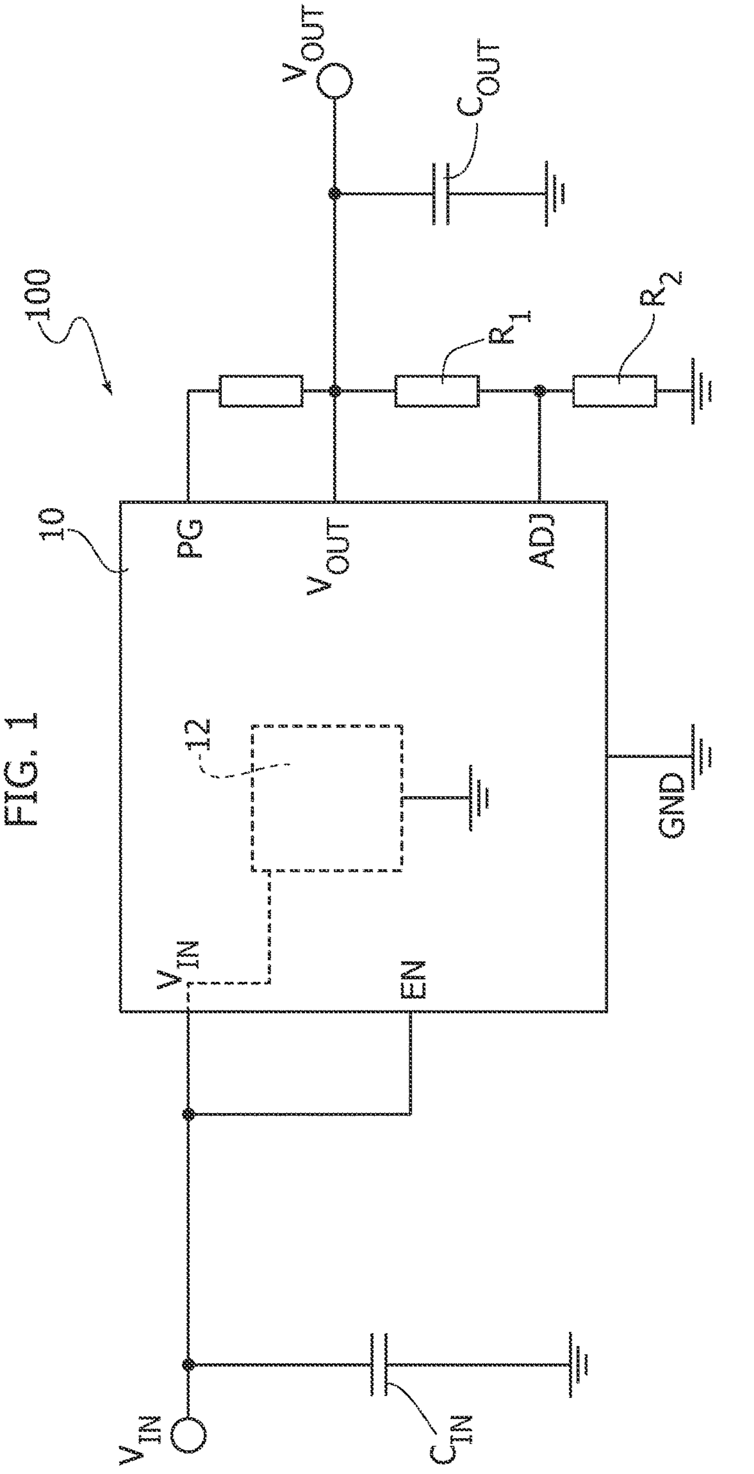
FIG. 1 is a diagram exemplary of a voltage regulator comprising a pre-regulator circuit.

As exemplified in FIG. 1, a device 100 comprises:

a low-dropout regulator 10 comprising a supply node $V_{IN}$ configured to receive a supply voltage from a supply source, such as a loaded capacitor $C_{IN}$, an enable node EN configured to activate voltage regulation, a ground node GND configured to be coupled to ground, an output node $V_{OUT}$ configured to be coupled to a load, such as a load capacitor $C_{OUT}$, an adjustment node ADJ configured to be coupled to the output node $V_{OUT}$, e.g., via a voltage divider R1, R2, configured ADJ to set the output node, for instance at a fraction of the output voltage determined by a resistor ratio, such as R1/R2, for instance;

a power-good or feedback node PG that monitors the voltage at the adjustment node ADJ to indicate the status of the output voltage.

Figure 2:
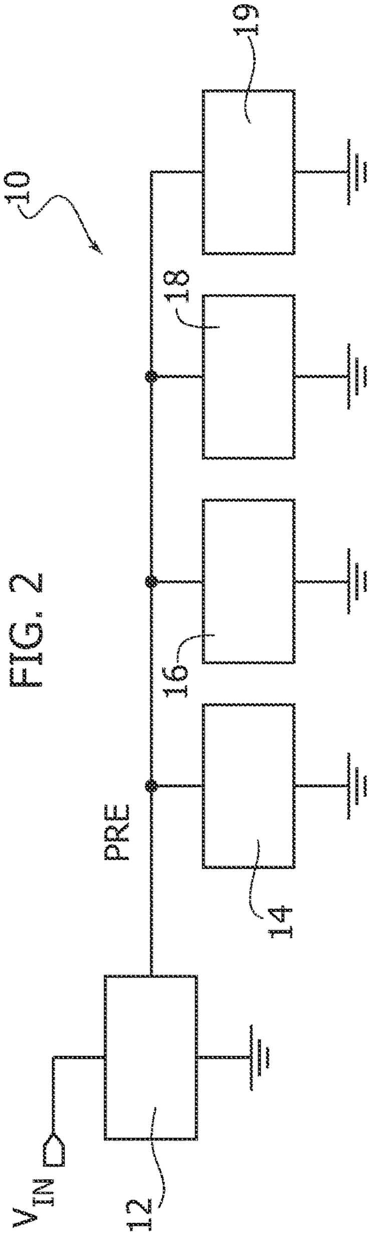
FIG. 2 is a circuit exemplary of load circuitry for the pre-regulator circuit of FIG. 1.

As exemplified in FIG. 2, the pre-regulator 12 may be coupled to load circuitry such as bandgap circuitry 14, operational amplifier circuitry 16, digital parts 18 and comparators 19, to provide a pre-regulated voltage PRE thereto.

For instance, the pre-regulator input voltage is 40 Volt, for automotive applications, for instance.

It may be possible to set PRE considering CMOS process parameters, such as 5 V, 3.3 V, 1.8V, 1.2V.

Figure 3:
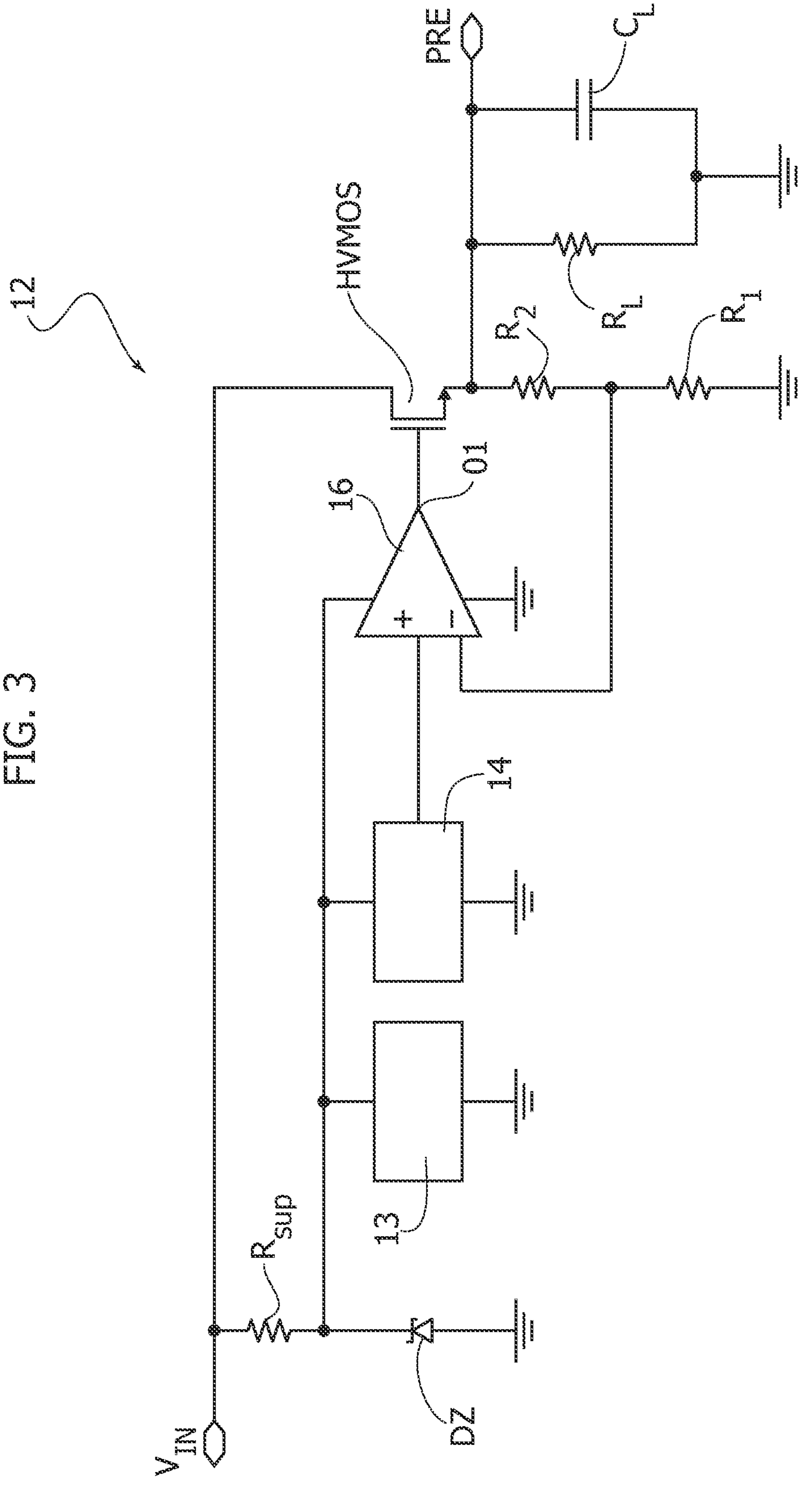
FIG. 3 is a diagram exemplary of a pre-regulator architecture.

As exemplified in FIG. 3, a conventional high voltage pre-regulator architecture coupled to a load $R_L$, $C_L$ comprises:

voltage clamping circuitry DZ, $R_{sup}$ (e.g., a 5V Zener diode with a startup resistor called $R_{sup}$) coupled to the supply node $V_{IN}$, a current generator circuit block 13 coupled to the voltage clamping circuitry DZ, $R_{sup}$, a low voltage bandgap 14 coupled to the current generator circuit block 13, an operational amplifier 16 comprising a first (e.g., non-inverting) input node+ coupled to the low voltage bandgap 14 and a second (e.g., negative) input node− coupled to the output node PRE via a feedback branch comprising the resistive divider R1, R2, and an output node O1 coupled to a gate node of a high voltage transistor HVMOS (e.g., an n-channel or p-channel power MOS).

Figure 4:
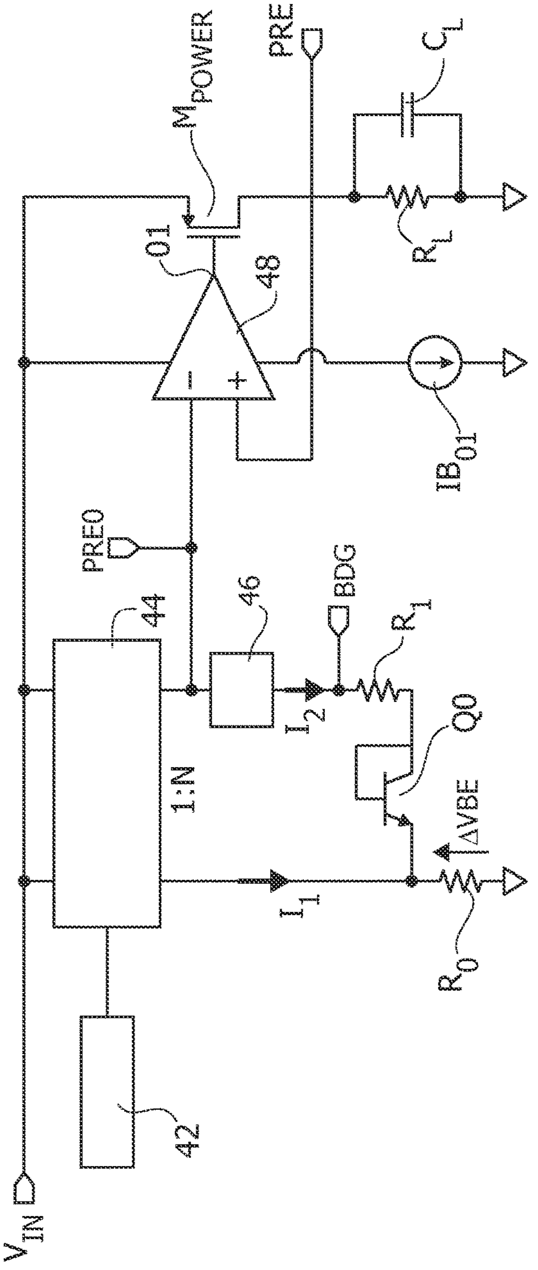
FIG. 4 is a diagram exemplary of a circuit as per the present disclosure.

As exemplified in FIG. 4, a pre-regulator circuit 40 according to the present disclosure comprises:

a supply node $V_{IN}$ configured to receive a supply voltage, a startup circuit 42, such as a current generator or a resistive element, an independent current source 44, such as a high voltage supply, configured to provide a first current I1 and a second current I2, as discussed in the following, a voltage multiplier circuit 46 (e.g., active or passive) coupled to an operational amplifier 48 and to the series of resistors R0, R1 and a transistor Q0 (such as a diode-connected BJT or MOS transistor, for instance), an operational amplifier 48 (e.g., in a buffer configuration) comprising a first input node − coupled to the independent current source 44, a second input node+ coupled to the output node PRE and an output node O1 coupled to the power transistor HVMOS (e.g., an n-channel transistor), the operational amplifier 48 being coupled to a current generator $I_{B01}$ configured to provide a bias current $I_{B01}$ thereto;

a bandgap voltage node BDG configured to be coupled to bandgap circuitry to receive a bandgap voltage BDG.

As exemplified in FIG. 4, the current generator 44 is configured to produce a first current I1 and a second current I2 which may be expressed as:

$$I_1 = \frac{1}{(1+N)}\frac{\Delta V_{BE}}{R_o}$$

$$I_2 = \frac{N}{(1+N)}\frac{\Delta V_{BE}}{R_o}I_1$$

where:

$\Delta V_{BE}$ is a proportional to absolute temperature (briefly, PTAT) voltage, e.g., provided by the Caprio cell, $R_0$ is the value of the resistance in the resistive branch, N is a (e.g., programmable) scaling factor of the current generator 44.

As exemplified in FIG. 4, the voltage at a reference node PRE0 intermediate the voltage multiplier circuit block 46 and the operational amplifier 48 is at a voltage level given by the sum of the bandgap voltage BDG and the (e.g., active) voltage multiplier circuit 46. For instance, the voltage at the reference node PRE0 is a high impedance and temperature independent voltage.

As exemplified in FIG. 4, the voltage at the pre-regulated output node PRE is substantially equal to that of the reference node PRE0, eventually affected solely by any non-ideal offset in the operational amplifier 48.

As exemplified in FIG. 4, the pre-regulated voltage PRE facilitates providing a current to the output load $R_L$, $C_L$ and to maintain a temperature-independent voltage level.

For instance, the active voltage multiplier facilitates obtaining a pre-regulated voltage level PRE (e.g., about 3.3 V above PRE0) from the bandgap voltage (e.g., about 1.3 V).

Figure 5:
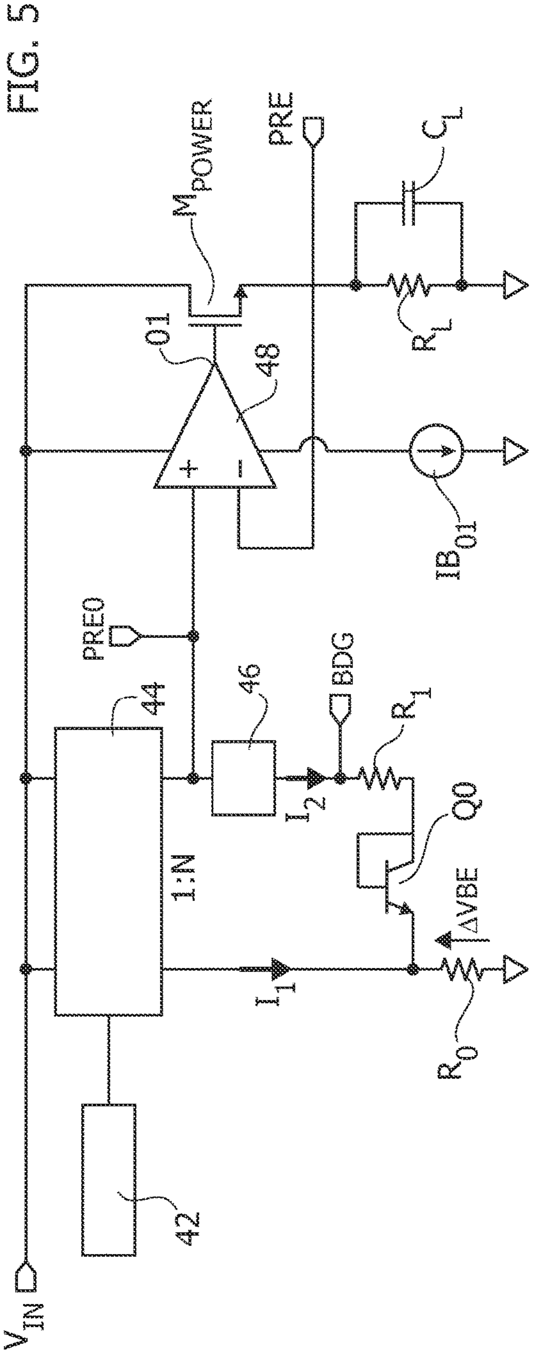
FIG. 5 is a diagram exemplary of a variant circuit as per the present disclosure.

As exemplified in FIGS. 4 and 5, the power transistor HVMOS may be a n-channel or a p-channel transistor.

For instance, the p-channel solution may be preferred in applications where the supply voltage $V_{IN}$ goes close to the pre-regulator voltage.

Figure 6:
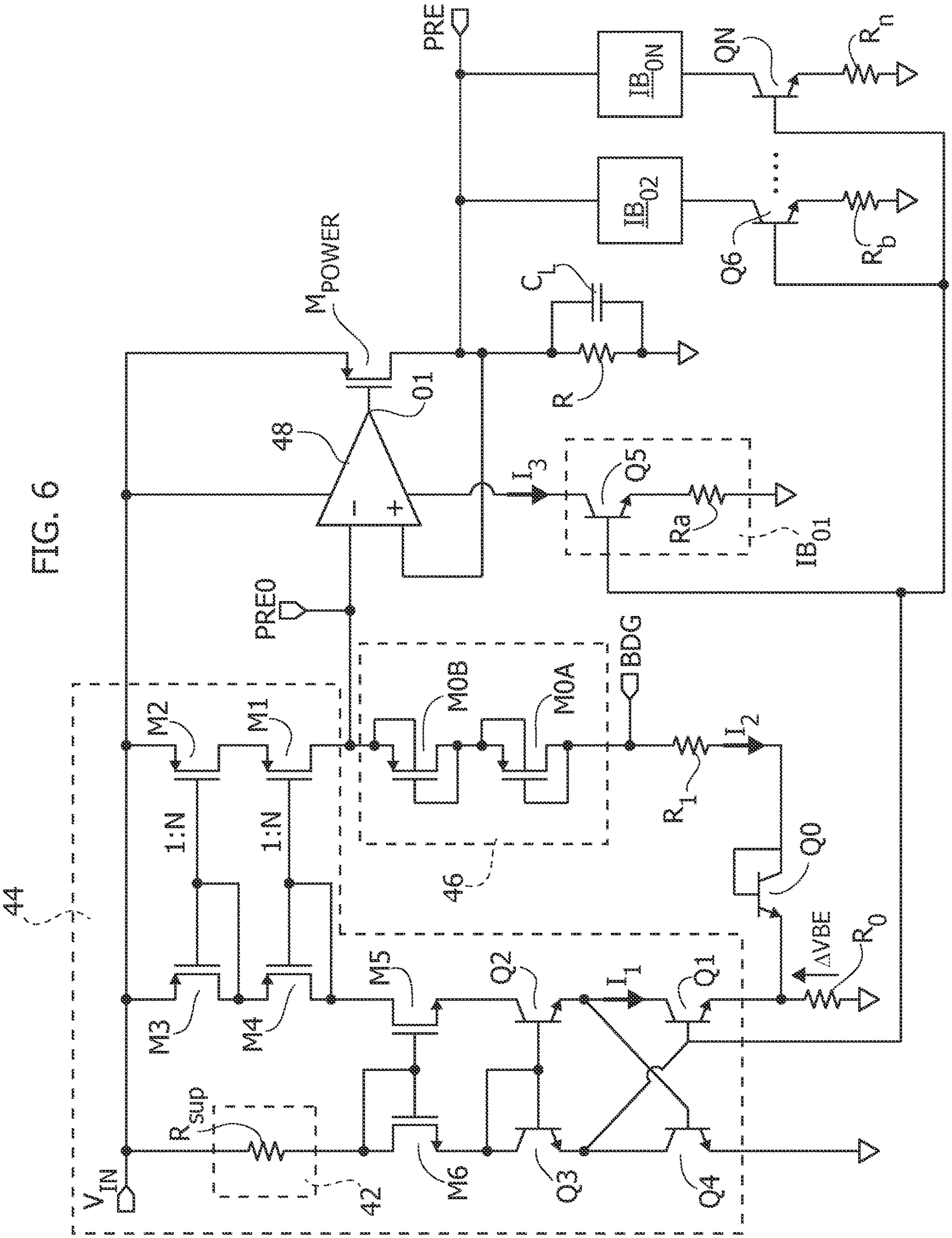
FIG. 6 is a diagram exemplary of a circuit as per the present disclosure.

As exemplified in FIG. 6, the independent current source 44 comprises a Caprio cell structure per se known. A Caprio cell as discussed on page 95 of Serdijn, Verhoeven & van Roermund: "Analog IC Techniques for Low-Voltage Low Power Electronics"—(1995) may be suitable for use in one or more embodiments.

As exemplified in FIG. 6, the startup circuitry 42 comprises the startup resistance Rsup in order to turn on Caprio Cell 44.

As exemplified in FIG. 6, the Caprio cell comprises:

a current mirror M5, M6 coupled to the supply node $V_{IN}$ via the startup resistor Rsup, configured to perform voltage clamping for other stages, active load pairs (e.g., p-channel MOSFETs) M3-M2 and M4-M1 with mirror ratio of 1 to N in cascode configuration, configured to protect low voltage component from the high input voltage (e.g., in a range from 40 Volt-100 Volt).

Figure 7:
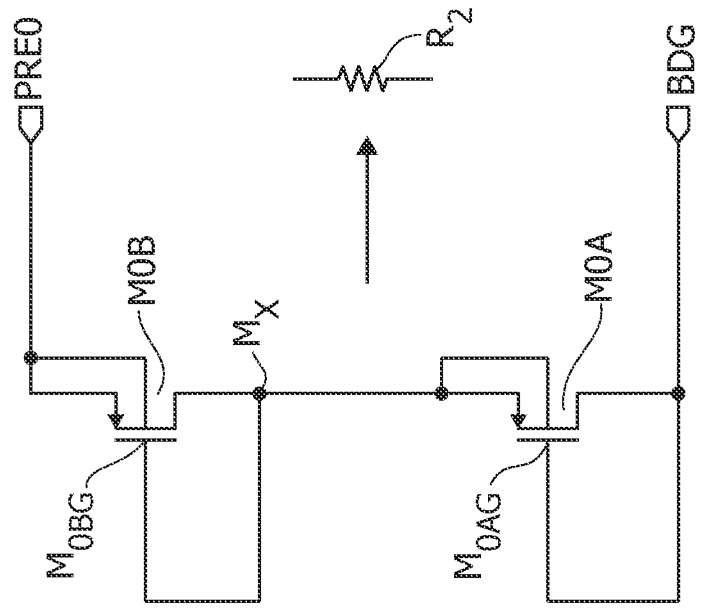
FIG. 7 is a diagram exemplary of a portion of FIG. 6.

As exemplified in FIGS. 6 and 7, the Caprio Cell comprises a quadruplet of bipolar transistors Q1, Q2, Q3, Q4 (e.g., 5 Volt NPN bipolar transistors) and a resistor R0, where:

a first bipolar transistor Q1 in the quadruplet of bipolar transistors Q1, Q2, Q3, Q4 has a first emitter area, e.g., about three times the second emitter area, a second bipolar transistor Q2 in the quadruplet of bipolar transistors s Q1, Q2, Q3, Q4 has a second emitter area, e.g., a unitary emitter area, a third bipolar transistor Q3 has an emitter area of three times the second emitter area and equal to the first emitter area, a fourth bipolar transistor Q4 comprises a fourth emitter area equal to the second emitter area of the second bipolar transistor Q2.

As exemplified in FIG. 6, at least one current generator $IB_{01}$ is coupled to the Caprio cell Q4, Q3, Q2, Q1, R0, the at least one current generator $IB_{01}$ comprising a fifth bipolar transistor Q5 (having a fifth unitary emitter area, for instance) and a bias resistive element Ra which is used to bias the operational amplifier 48 with an adequate current I3 (e.g., about 60 nA, with 1 nA=1 nanoAmpere=$10^{-9}$ A).

As exemplified in FIG. 6, the bias current $I_3$ is a function of the current generated from the Caprio cell.

As exemplified in FIG. 6, the PTAT voltage $\Delta V_{BE}$ on the resistor $R_0$ can be expressed as:

$$\Delta V_{BE} = \frac{KT}{q} * \ln\frac{AE_{Q3} * AE_{Q1}}{AE_{Q4} * AE_{Q2}} = V_T * \ln\frac{AE_{Q3} * AE_{Q1}}{AE_{Q4} * AE_{Q2}}$$

where:

$$V_T = \frac{KT}{q} \sim 26 \text{ mV @ } 300K\,(27^\circ \text{ C.) is the Thermal Voltage}$$

k is Boltzmann Constant,

T is temperature in Kelvin, q is electron charge, $AE_{Q3}$ is the area of the third bipolar transistor, $AE_{Q1}$ is the area of the first bipolar transistor, $AE_{Q2}$ is the area of the second bipolar transistor, $AE_{Q4}$ is the area of the fourth bipolar transistor.

For instance, at room temperature (that is, a temperature T about 300 K), the PTAT voltage $\Delta V_{BE}$ may be expressed as:

$$\Delta V_{BE}(\text{@300K})=0.026*\ln 9=0.05712 \text{ V.}$$

For instance, plugging the room temperature value of the threshold voltage $\Delta V_{BE}$(@300K) into the expressions for the first current I and the second current $I_2$, and in the exemplary case in which the scaling factor N of the current generator N is unitary, their values may be computed as:

$$I_1 = I_2 = \frac{1}{2} * \frac{\Delta VBE}{R_o}$$

In an exemplary scenario in which, for instance, the first current I and the second current $I_2$ have values about 30 nA (1 nA=$10^{-9}$ Ampere=1 nanoAmpere), the resistance $R_0$ may be designed to have a resistance value $R_0$=952 kΩ.

As exemplified in FIG. 6, the current I3 that is used to bias the operational amplifier 48 can be determined with the following expression:

$$I_3 = \frac{\Delta VBE + (VBE_{Q1} - VBE_{Q5})}{Ra} = \frac{V_T * \ln\frac{AE_{Q3} * AE_{Q5}}{AE_{Q4} * AE_{Q2}}}{Ra}$$

where

Ra is the resistance of the bias resistive element, $VBE_{Q1}$ is the base-emitter voltage of the first bipolar transistor, $VBE_{Q5}$ is the base-emitter voltage of the fifth bipolar transistor.

For instance, in order to obtain a bias current $I_3$ about 60 nA, the resistance Ra of the current generator $IB_{01}$ may be set to a value about 476 kΩ.

As exemplified in FIG. 7, the bandgap voltage received at the bandgap voltage node V(BDG) may be expressed as:

$$V(BDG) = \Delta V_{BE} + VBE_{Qo} + \frac{R_1}{2 * Ro} * \Delta V_{BE}$$

where $VBE_{Q0}$ is the complementary quantity to the PTAT voltage $\Delta V_{BE}$, $R_1$ is the resistance intermediate the bandgap voltage node BDG and the diode-connected transistor (e.g., BJT) $Q_0$.

For instance, the resistance $R_1$ may be a function of the resistance $R_0$, e.g., $R_1$=2*N*$R_0$ with N depending from the technology; this may facilitate to provide a voltage with a desired curve profile in temperature at the bandgap node BDG.

For instance, considering a resistance value $R_1$ about 24 MΩ, it follows that $VBE_{Q0}$=0.533 Volt.

For instance, the bandgap voltage received at the bandgap voltage node BDG may be at a voltage level about 1.31V at room temperature.

As exemplified in FIG. 6, the reference voltage PREo at the reference node PREo may be expressed as:

$$V(\text{PREo})=V(BDG)+2*(V_{TH}+V_{OVDRV})=V(BDG)+VGS_{MoA}+VGS_{MoB}=2V_{GS}$$

where $V_{TH}$ is a threshold voltage of the transistors pair of diode-connected transistors MoA, M0B, and $VGS_{MoA}$+$VGS_{MoB}$ is the sum of the voltage threshold of a pair of diode-connected transistors MoA, MoB, and $V_{OVDRV}$ is the voltage overdrive of these MOSs.

For instance, a voltage threshold thermal coefficient (briefly, T.C.) of a, e.g., PMOS, transistor in temperature, in the technology used, may be about: Vth (T.C.) PMOS=−1.1 mV/° C.

For instance, the overdrive voltage $V_{OVDRV}$ may be designed via setting a ration of width to length, e.g., (W/L), in order to balance in temperature, the negative variation of the threshold voltage $V_{TH}$.

As exemplified in FIG. 6, the second current $I_2$ (which is a function of the first current $I_1$) flows through diode-connected transistors $M_{0A}$ and $M_{0B}$, that depend on PTAT voltage $\Delta V_{BE}$, so that it increases in temperature.

Therefore, the reference voltage PRE0 may be considered voltage independent in temperature (save for the case of a temperature drift, for instance).

As exemplified in FIG. 6, a set of current generators $IB_{01}$, $IB_{02}$, . . . , $IB_{0N}$ may be coupled to the Caprio cell Q1, Q2, Q3, Q4 in order to provide a bias current supply to a respective set of load circuits 16, 18, 19 coupled to the pre-regulated voltage level PRE.

For instance, current generators in the set of current generators $IB_{01}$, $IB_{02}$, . . . , $IB_{0N}$ may each comprise a series of a bipolar transistor Q6, . . . , QN having a first transistor terminal coupled to the Caprio cell 44, a second transistor terminal coupled to a respective resistive element Rb, . . . , $R_N$ and a third transistor terminal coupled to a respective load of the set of loads 16, 18, 19.

For instance, a j-th current generator of the set of current generators $IB_{01}$, $IB_{02}$, . . . , $IB_{0N}$ may be configured to provide a respective current Ij which may be expressed as:

$$I_j = \frac{\Delta VBE + (VBE_{Q1} - VBE_{QN})}{Rj} = \frac{V_T * \ln\frac{AE_{Q3} * AE_{Qj}}{AE_{Q4} * AE_{Q2}}}{Rj}$$

where

Rj is the resistance of the j-th bias resistive element, $VBE_{Q1}$ is the base-emitter voltage of the first bipolar transistor, $VBE_{QN}$ is the base-emitter voltage of the N-th bipolar transistor.

As exemplified in FIGS. 6 and 7, instead of a diffused or poly resistor $R_2$, the internal resistance of the diode-connected pair of transistors $M_{0A}$ and $M_{0B}$ may be exploited.

For instance, dummy structures around these diode-connected transistors $M_{0A}$ and $M_{0B}$ may be utilized, in a manner per se known, to minimize the process spread among the two transistors $M_{0A}$ and $M_{0B}$, as a matched layout thereof may improve performance.

Figure 8A:
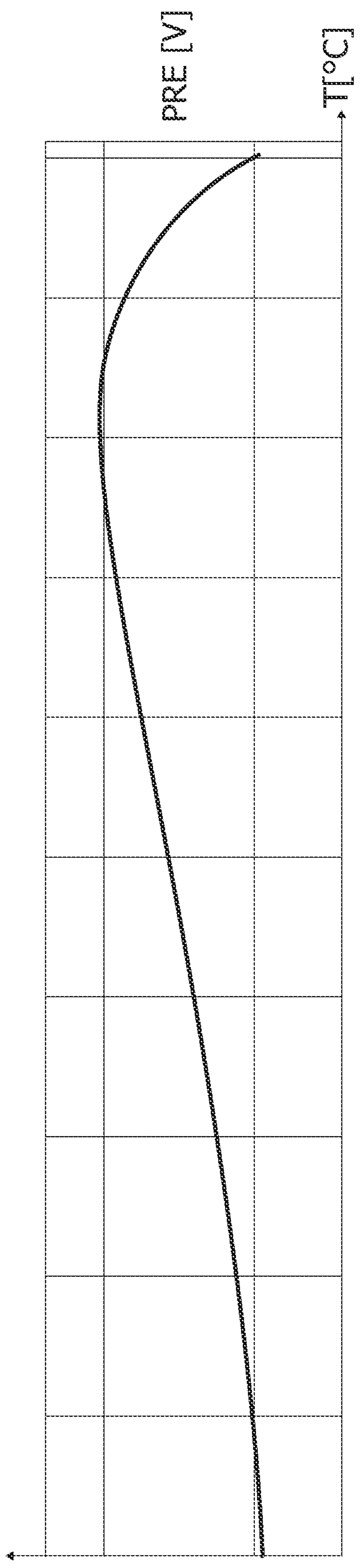
FIGS. 8A and 8B are diagrams exemplary of voltage signals in one or more embodiments.
Figure 8B:
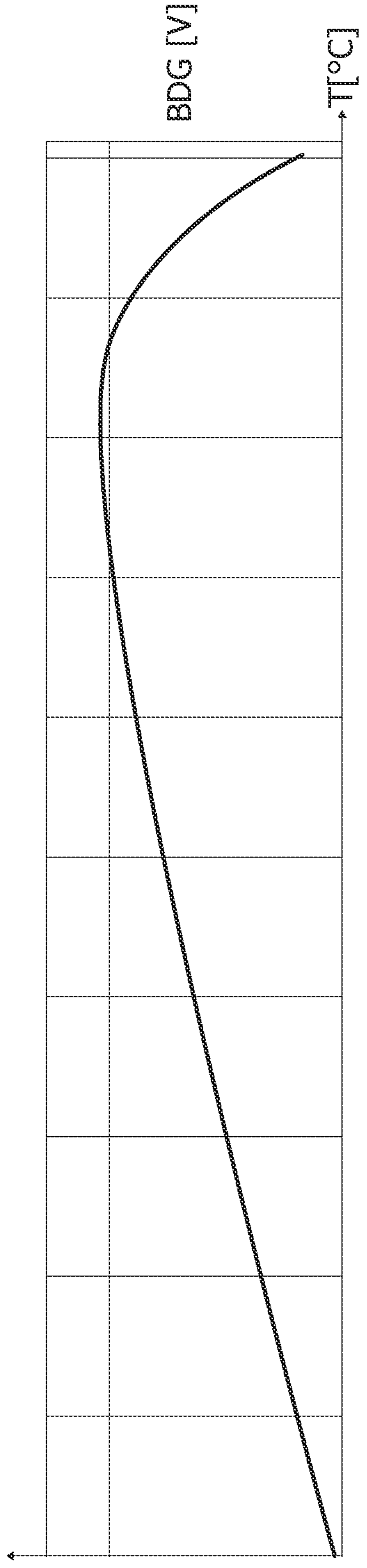

As exemplified in FIGS. 8A and 8B, using the circuit 40 as per the present disclosure, the drift of the pre-regulated voltage PRE and of the bandgap BDG can be limited, e.g., to about 60 mV, that is 1.8%, within a temperature range [−40° C., 160° C.].

As exemplified herein, a circuit 40 comprises:

supply node $V_{IN}$ configured to receive a supply voltage $V_{IN}$ from a power-supply source $C_{IN}$, $V_{IN}$;

an output node PRE configured to be coupled to a load $R_L$, $C_L$ to provide a regulated voltage PRE;

startup circuitry 42 coupled to the supply node $V_{IN}$ to receive the supply voltage, the startup circuitry configured to provide a startup voltage as a function of the supply voltage;

current generator circuitry 44 coupled to the startup circuitry to receive the startup voltage, the current generator circuitry configured to produce a first current I having a first current intensity and a second current $I_2$ having a second current intensity, wherein the second current intensity of the second current $I_2$ is a function of the first current intensity of the first current $I_1$;

a bandgap node BDG configured to be coupled to bandgap circuitry to receive a bandgap voltage;

multiplier circuitry 46 coupled to the bandgap node and to the current generator circuitry to receive the second current $I_2$, the multiplier circuitry 46 configured to apply scaling by an integer scaling factor N to the second current, providing a scaled version of the second current at the bandgap node, the scaled version of the second current $I_2$ having a current intensity scaled by the integer scaling factor N with respect to the first current intensity of the first current h;

a first diode-connected transistor (e.g., BJT) $Q_0$ having a current flow path therethrough between a first transistor node and a second transistor node, the first transistor $Q_0$ having a control node coupled to the first transistor node and to the bandgap node as well as having the second transistor node coupled to the current generator circuitry, the first transistor configured to provide a threshold voltage drop across the first transistor node and the transistor node;

a first resistive element $R_1$ interposed between the first switch/transistor and the bandgap node;

a second resistive element R0 referred to ground coupled to the second node of the first transistor $Q_0$;

a second transistor HVMOS having a control node and a current flow path therethrough between the supply node $V_{IN}$ and the output node PRE, and an operational amplifier 48 having a first input node–, PRE0 coupled to the current generator circuitry 44 and the multiplier circuitry 46, the first input node–, PRE0 of the operational amplifier 48 being configured to receive a pre-regulated voltage PRE0 as a function of the bandgap voltage BDG, the threshold voltage across the first transistor $Q_0$ and a voltage drop across the first resistive element $R_1$ and the second resistive element R0, the operational amplifier comprising a second input node– coupled to the output node PRE via a feedback branch, the operational amplifier having an output node OI coupled to the control node of the second transistor HVMOS and configured to provide a regulated voltage based on the pre-regulated voltage PRE0 to the output node of the circuit.

As exemplified herein, the startup circuitry 42 comprises a startup resistive element Rsup coupled to the supply voltage node $V_{IN}$, and the current generator circuitry comprises a plurality of transistors M2, M3, M4, M5, M6 arranged as a cascade of current mirrors, the plurality of transistors coupled to the startup resistive element and to the supply voltage node, wherein transistors in the plurality of current transistors have respective transistor areas proportional therebetween, and the cascade of current mirrors provides a mirror ratio equal to the integer scaling factor N.

As exemplified herein, the current generator circuitry 44 comprises a Caprio cell comprising a quadruplet of Caprio cell switches (e.g., BJT and/or MOSFET transistors) Q1, Q2, Q3, Q4.

For instance:

a first Caprio cell switch (e.g., a transistor) Q1 of the quadruplet of switches in the Caprio cell comprises a first area, a second Caprio cell switch (e.g., a transistor) Q2 of the quadruplet of switches in the Caprio cell comprises a unitary area, a third Caprio cell switch (e.g., a transistor) Q3 of the quadruplet of switches in the Caprio cell comprises a third area equal to the first area, and a fourth Caprio cell switch (e.g., a transistor) Q4 of the quadruplet of switches in the Caprio cell comprises a fourth area equal to the unitary area of the second switch of the quadruplet of switches.

As exemplified herein, the current generator circuitry 44 is configured to produce the first current intensity of the first current I1 expressed as:

$$I_1 = \frac{1}{(1+N)}\frac{\Delta V_{BE}}{R_o}$$

and the second current intensity of the second current 0$I_2$ expressed as:

$$I_2 = \frac{N}{(1+N)}\frac{\Delta V_{BE}}{R_o}I_1$$

where

N is the integer scaling factor, and

R0 is the resistance of the second resistive element.

As exemplified herein, the operational amplifier 48 comprises biasing circuitry $I_{B01}$, and the biasing circuitry comprises a biasing current generator configured to provide a bias current $I_{B01}$ to the operational amplifier.

As exemplified herein, the biasing current generator is coupled to the current generator circuitry to receive the first current I, the biasing current generator comprising a fifth transistor $Q_5$ coupled to a bias resistive element Ra, wherein the fifth transistor $Q_5$ has a unitary area.

As exemplified herein, the multiplier circuitry comprises a pair of diode-connected transistors $M_{0A}$, $M_{0B}$, wherein diode-connected transistors in the pair of diode-connected transistors have a same transistor area.

As exemplified herein, a voltage regulator device 100 comprises:

a power-supply source $C_{IN}$, $V_{IN}$ configured to provide a supply voltage $V_{IN}$;

at least one load $R_L$, $C_L$ configured to receive a regulated voltage PRE, $V_{OUT}$;

bandgap circuitry 14 configured to produce a bandgap voltage BDG, and a circuit 40 as per the present disclosure having the supply node coupled to the power-supply source), the bandgap node coupled to the bandgap circuitry to receive the bandgap voltage and the output node coupled to the at least one load to provide the regulated voltage thereto.

As exemplified herein, the at least one load $R_L$, $C_L$ comprises at least one circuit selected out of a bandgap circuit 14, a comparator circuit 16 and an operational amplifier circuit 18.

Figure 9:
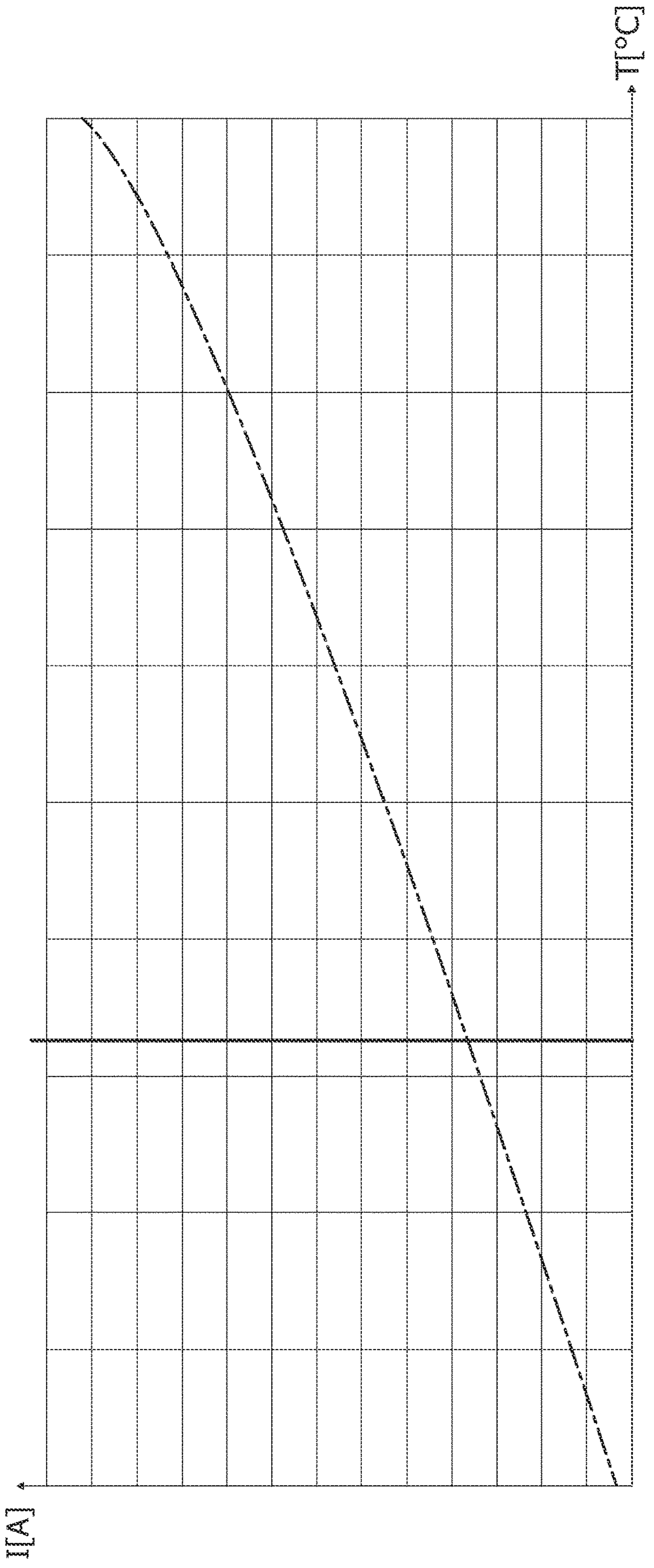
FIG. 9 is a diagram exemplary of a current signal in one or more embodiments.

As exemplified in FIG. 9, a quiescent current level I may vary over temperature. For instance, in case of a conventional supply voltage level and without any load $C_L$, R, the quiescent current level I may vary in a range of values of few nanoAmperes.

Figure 10A:
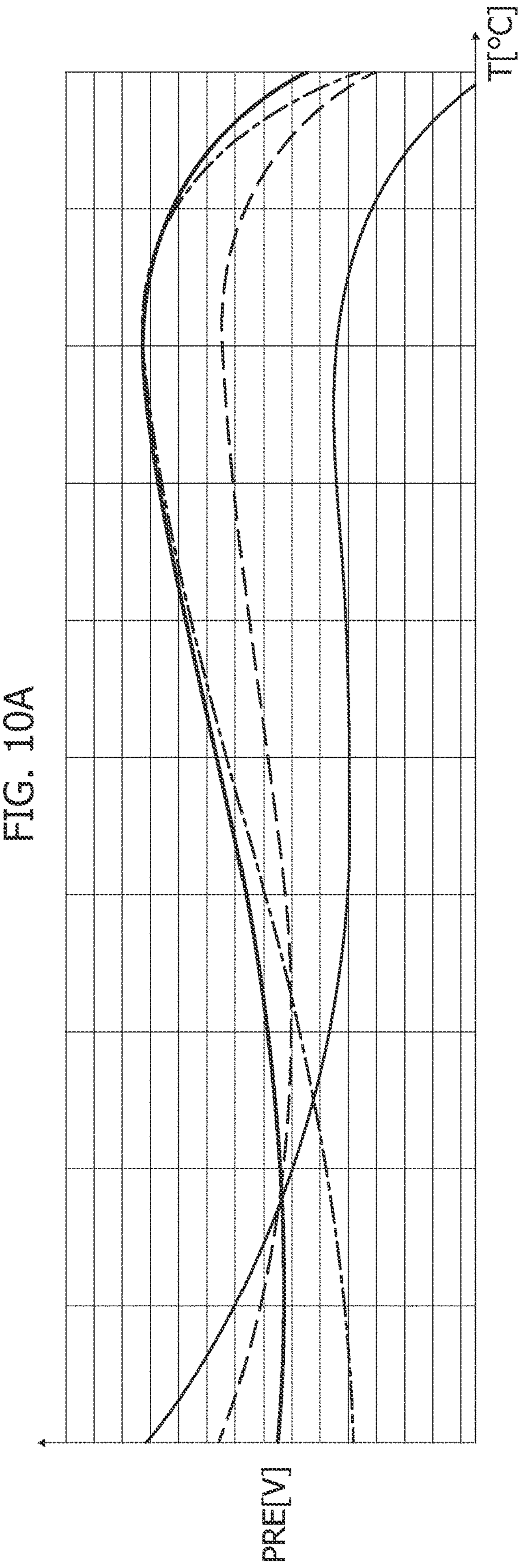
FIGS. 10A and 10B are diagrams exemplary of voltage signals in one or more embodiments.
Figure 10B:
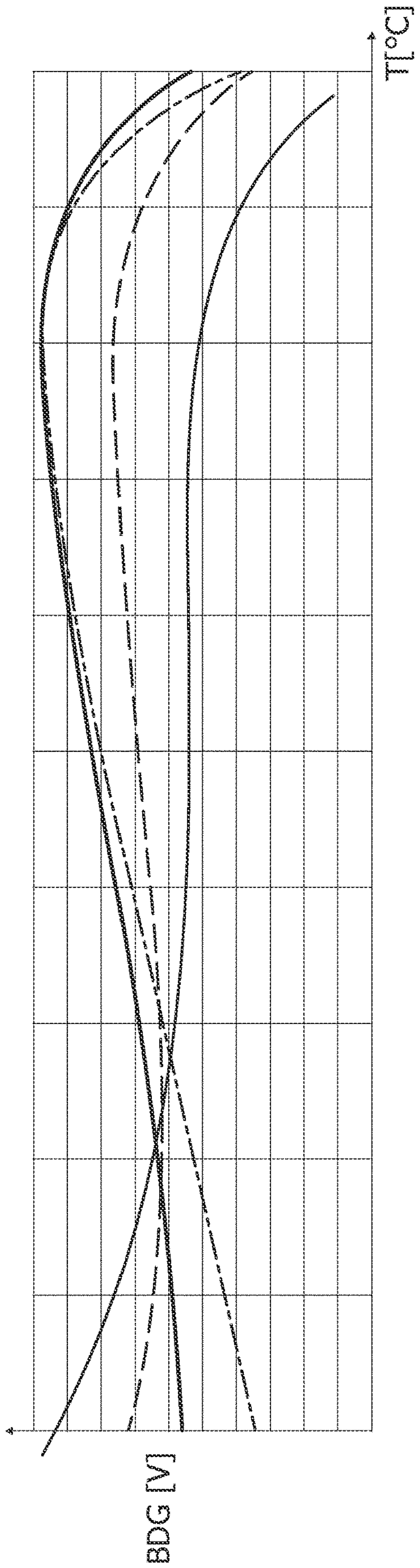
Figure 11A:
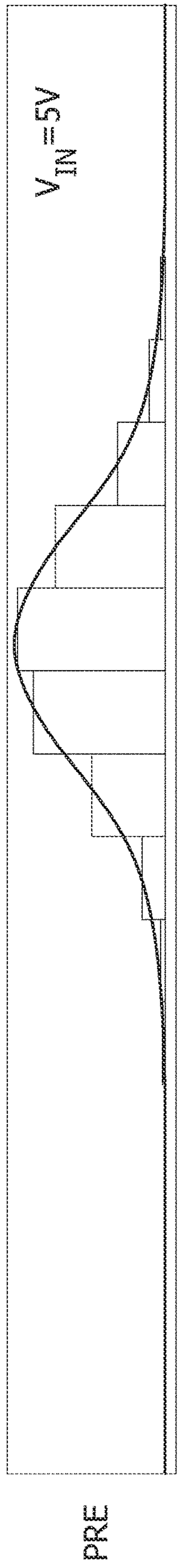
FIGS. 11A, 11B, 11C and 11D are diagrams exemplary of distributions of voltage signal values in various operating conditions of the circuit as per the present disclosure.
Figure 11B:
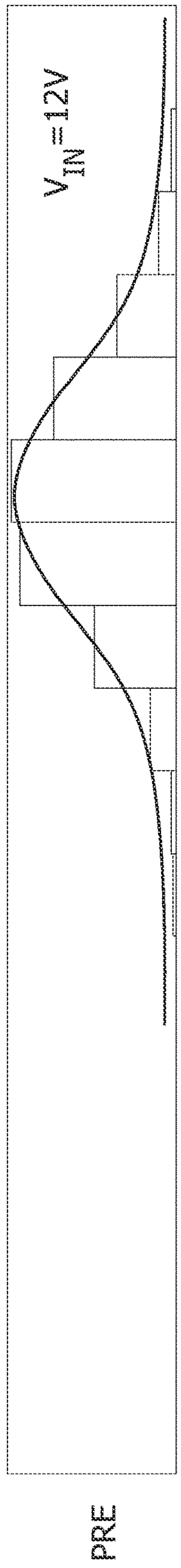
Figure 11C:
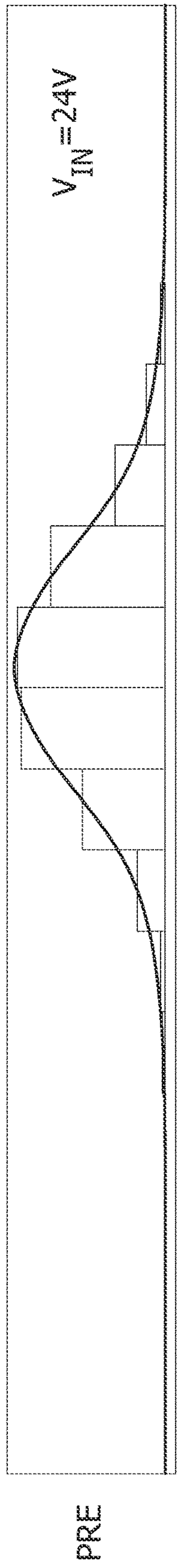
Figure 11D:
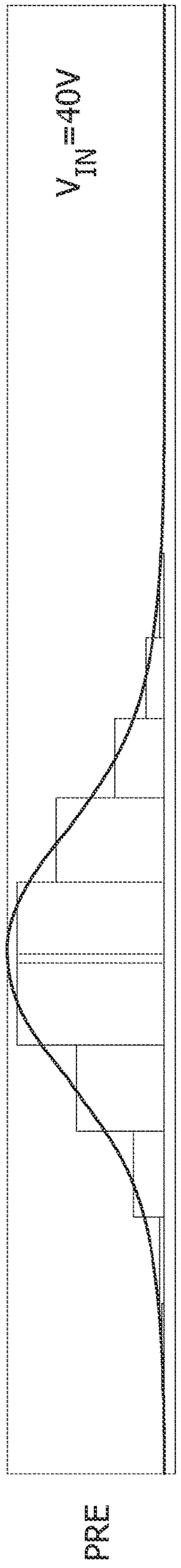
Figure 12:
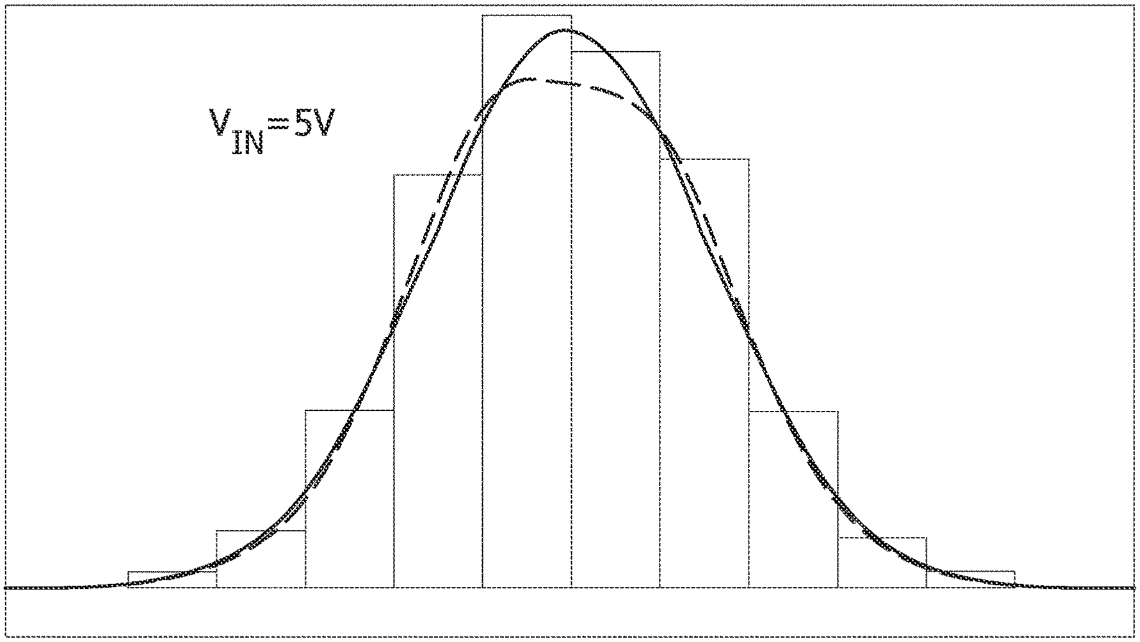
FIGS. 12, 13, 14 and 15 are diagrams exemplary of distributions of current signal values in various operating conditions of the circuit as per the present disclosure.
Figure 13:
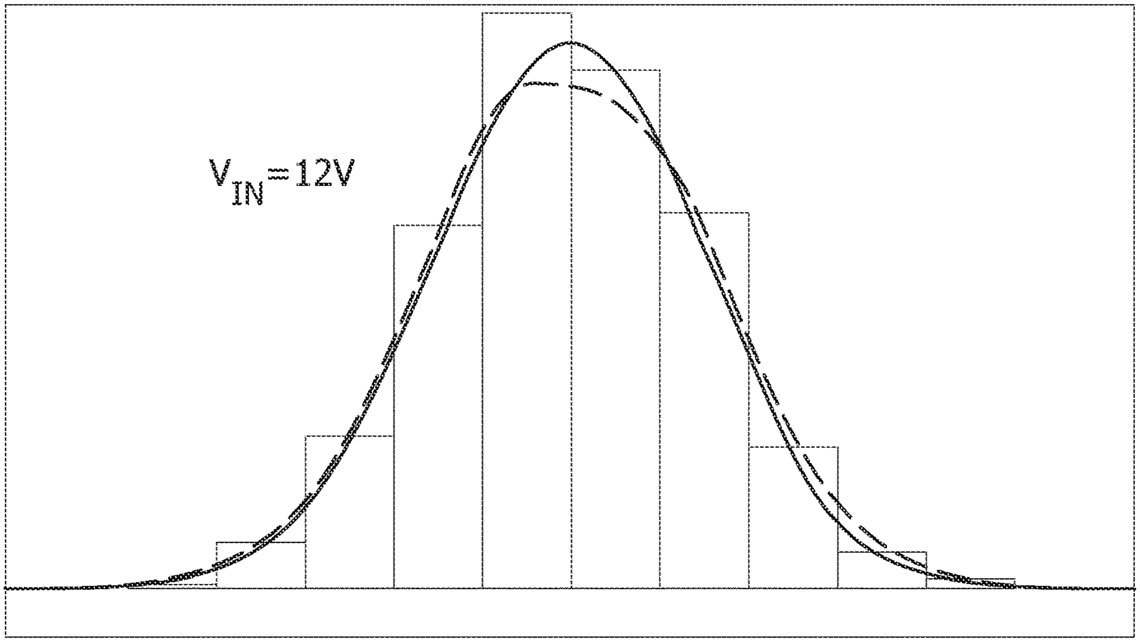
Figure 14:
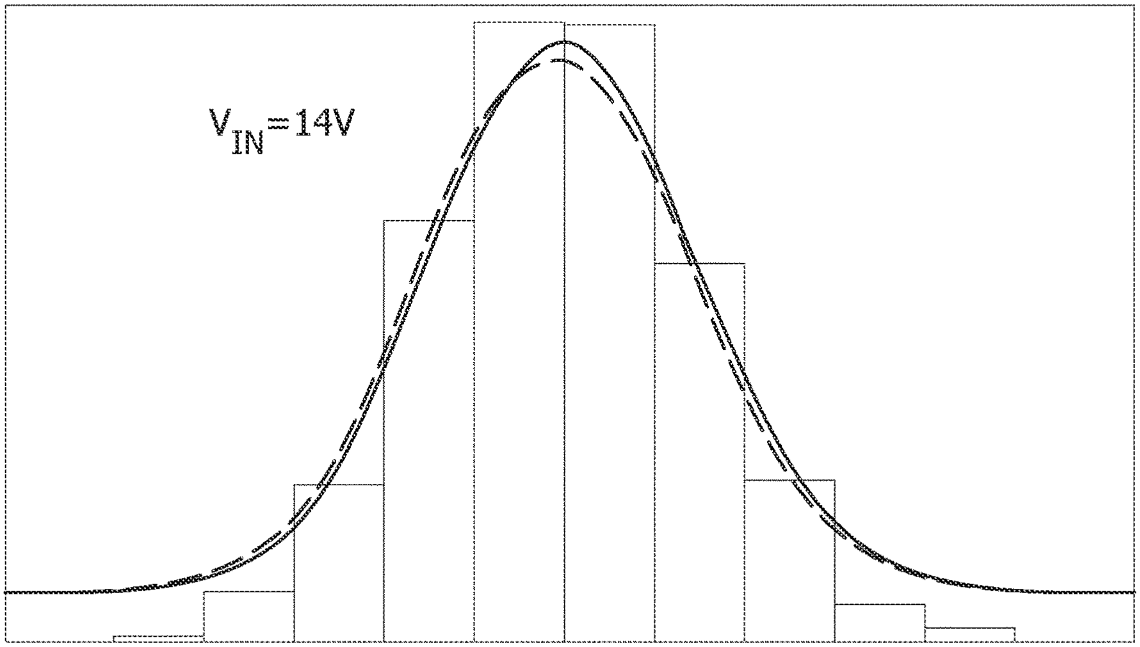
Figure 15:
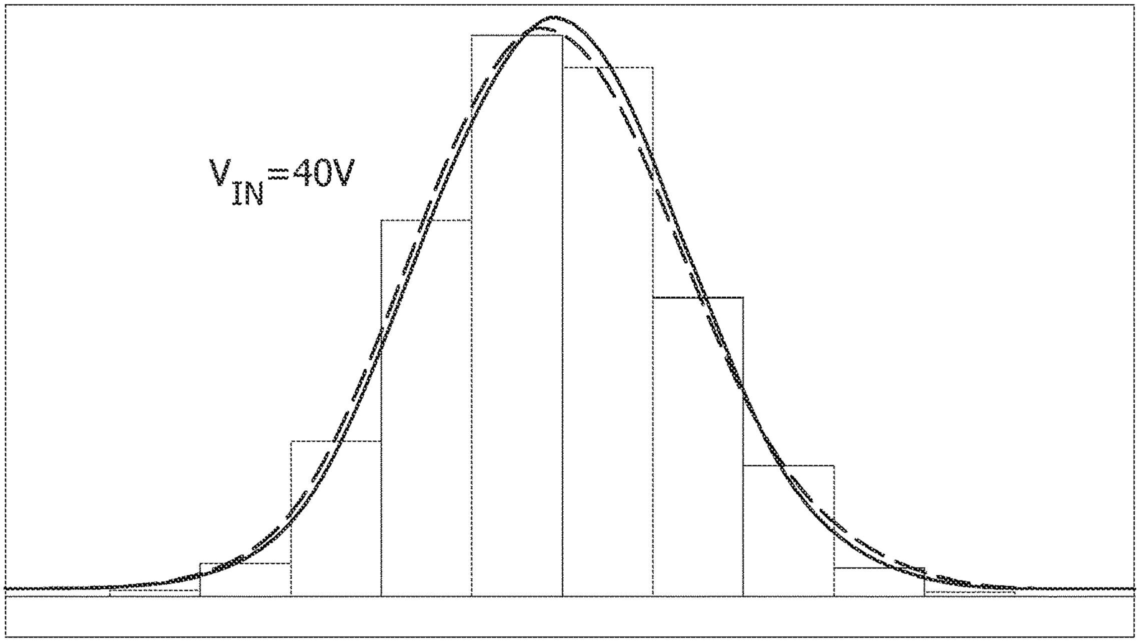

As exemplified in FIGS. 10A and 10B, various curves are shown each corresponding to values of the pre-regulated voltage as a function of temperature for a certain value of the supply voltage (e.g., in a range between 5 Volt and 40 Volt).

As exemplified in FIGS. 10A and 10B, the pre-regulated voltage PRE and bandgap values BDG vary in a limited range of values and may be considered substantially constant in temperature.

As exemplified in FIGS. 11A, 11B, 11C, 11D, various distribution of the pre-regulated voltage PRE at a fixed temperature of 27° C. while varying supply voltage $V_{IN}$ (e.g., between 5V, as exemplified in FIG. 11A, and 40V, as exemplified in FIG. 11D), show a standard deviation about 0.22%, therefore resulting substantially independent of the value of the supply voltage $V_{IN}$.

FIGS. 12 to 15 represent current consumption (e.g., quiescent current I) with zero load and supply voltage $V_{IN}$ varying in a given range (e.g., between 5V, as exemplified in FIG. 12, and 40V, as exemplified in FIG. 15) at fixed temperature (e.g., about 27° C.).

Table I below summarizes the average values of the quiescent current I (in nanoAmpere, where 1 nanoAmpere=10-9 A) as a function of the supply voltage level VIN in case of fixed temperature (e.g., at 27° C.).

TABLE I

| $V_{IN}$ [V] | I [nA] |
|---|---|
| 5 | 168 |
| 12 | 226 |
| 24 | 325 |
| 40 | 460 |

As the quiescent current consumption of the internal pre-regulator is one of the major contributions to the total LDO power consumption, the proposed circuit and device facilitate its reduction.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

What is claimed is:

1. A circuit, comprising:

a supply node configured to receive a supply voltage from a power-supply source;

an output node configured to be coupled to a load to provide a regulated voltage;

startup circuitry coupled to the supply node to receive the supply voltage, the startup circuitry configured to provide a startup voltage as a function of the supply voltage;

current generator circuitry coupled to the startup circuitry to receive the startup voltage, the current generator circuitry configured to produce a first current having a first current intensity, and a second current having a second current intensity, wherein the second current intensity of the second current is a function of the first current intensity of the first current;

a bandgap node configured to be coupled to bandgap circuitry to receive a bandgap voltage;

multiplier circuitry coupled to the bandgap node and to the current generator circuitry to receive the second current, the multiplier circuitry configured to apply scaling by an integer scaling factor N to the second current, providing a scaled version of the second current at the bandgap node, the scaled version of the second current having a current intensity scaled by the integer scaling factor N with respect to the first current intensity of the first current;

a first transistor having a first current flow path therethrough between a first transistor node and a second transistor node, the first transistor having a first control node coupled to the first transistor node and to the bandgap node, the first transistor having the second transistor node coupled to the current generator circuitry, and the first transistor configured to provide a threshold voltage drop across the first transistor node and the second transistor node;

a first resistive element interposed between the first transistor and the bandgap node;

a second resistive element coupled between ground and the second transistor node;

a second transistor having a second control node, and a second current flow path therethrough between the supply node and the output node; and an operational amplifier having a first input node coupled to the current generator circuitry and the multiplier circuitry, wherein the first input node of the operational amplifier is configured to receive a pre-regulated voltage as a function of the bandgap voltage, the threshold voltage across the first transistor, and a voltage drop across the first resistive element and the second resistive element, the operational amplifier comprising a second input node coupled to the output node via a feedback branch, the operational amplifier having an op-amp output coupled to the second control node of the second transistor, and configured to provide the regulated voltage based on the pre-regulated voltage to the output node of the circuit.

2. The circuit of claim 1, wherein:

the startup circuitry comprises a startup resistive element coupled to the supply node; and the current generator circuitry comprises a plurality of transistors arranged as a cascade of current mirrors, the plurality of transistors coupled to the startup resistive element and to the supply node, wherein transistors in the plurality of transistors have respective transistor areas proportional therebetween and the cascade of current mirrors provides a mirror ratio equal to the integer scaling factor N.

3. The circuit of claim 1, wherein the current generator circuitry comprises a Caprio cell comprising a quadruplet of Caprio cell switches, wherein:

a first Caprio cell switch of the quadruplet of Caprio cell switches in the Caprio cell comprises a first area;

a second Caprio cell switch of the quadruplet of Caprio cell switches in the Caprio cell comprises a unitary area;

a third Caprio cell switch of the quadruplet of Caprio cell switches in the Caprio cell comprises a third area equal to the first area; and a fourth Caprio cell switch of the quadruplet of Caprio cell switches in the Caprio cell comprises a fourth area equal to the unitary area of the second Caprio cell switch of the quadruplet of Caprio cell switches.

4. The circuit of claim 3, wherein:

the operational amplifier comprises biasing circuitry;

the biasing circuitry comprises a biasing current generator configured to provide a bias current to the operational amplifier; and the biasing current generator is coupled to the current generator circuitry to receive the first current, the biasing current generator comprising a fifth switch coupled to a bias resistive element, wherein the fifth switch has the unitary area.

5. The circuit of claim 1, wherein the current generator circuitry is configured to produce the first current intensity of the first current expressed as:

$$I_1 = \frac{1}{(1+N)}\frac{\Delta V_{BE}}{R_o}$$

and the second current intensity of the second current expressed as:

$$I_2 = \frac{N}{(1+N)}\frac{\Delta V_{BE}}{R_o}I_1$$

where N is the integer scaling factor, and R0 is the resistance of the second resistive element.

6. The circuit of claim 1, wherein:

the operational amplifier comprises biasing circuitry; and the biasing circuitry comprises a biasing current generator configured to provide a bias current to the operational amplifier.

7. The circuit of claim 1, wherein the multiplier circuitry comprises a pair of diode-connected transistors, wherein diode-connected transistors in the pair of diode-connected transistors have a same transistor area.

8. A voltage regulator device, comprising:

a power-supply source configured to provide a supply voltage;

at least one load configured to receive a regulated voltage;

bandgap circuitry configured to produce a bandgap voltage; and a circuit comprising:

a supply node configured to receive the supply voltage from the power-supply source;

an output node configured to be coupled to a load to provide the regulated voltage;

startup circuitry coupled to the supply node to receive the supply voltage, the startup circuitry configured to provide a startup voltage as a function of the supply voltage;

current generator circuitry coupled to the startup circuitry to receive the startup voltage, the current generator circuitry configured to produce a first current having a first current intensity, and a second current having a second current intensity, wherein the second current intensity of the second current is a function of the first current intensity of the first current;

a bandgap node configured to be coupled to bandgap circuitry to receive the bandgap voltage;

multiplier circuitry coupled to the bandgap node and to the current generator circuitry to receive the second current, the multiplier circuitry configured to apply scaling by an integer scaling factor N to the second current, providing a scaled version of the second current at the bandgap node, the scaled version of the second current having a current intensity scaled by the integer scaling factor N with respect to the first current intensity of the first current;

a first transistor having a first current flow path therethrough between a first transistor node and a second transistor node, the first transistor having a first control node coupled to the first transistor node and to the bandgap node, the first transistor having the second transistor node coupled to the current generator circuitry, and the first transistor configured to provide a threshold voltage drop across the first transistor node and the second transistor node;

a first resistive element interposed between the first transistor and the bandgap node;

a second resistive element coupled between ground and the second transistor node;

a second transistor having a second control node, and a second current flow path therethrough between the supply node and the output node; and an operational amplifier having a first input node coupled to the current generator circuitry and the multiplier circuitry, wherein the first input node of the operational amplifier is configured to receive a pre-regulated voltage as a function of the bandgap voltage, the threshold voltage across the first transistor, and a voltage drop across the first resistive element and the second resistive element, the operational amplifier comprising a second input node coupled to the output node via a feedback branch, the operational amplifier having an op-amp output coupled to the second control node of the second transistor, and configured to provide the regulated voltage based on the pre-regulated voltage to the output node of the circuit, wherein the supply node is coupled to the power-supply source, the bandgap node is coupled to the bandgap circuitry to receive the bandgap voltage, and the output node is coupled to the at least one load to provide the regulated voltage thereto.

9. The voltage regulator device of claim 8, wherein the at least one load comprises at least one load circuit selected from: a second bandgap circuit, a comparator circuit, or an operational amplifier circuit.

10. The voltage regulator device of claim 8, wherein:

the startup circuitry comprises a startup resistive element coupled to the supply node; and the current generator circuitry comprises a plurality of transistors arranged as a cascade of current mirrors, the plurality of transistors coupled to the startup resistive element and to the supply node, wherein transistors in the plurality of transistors have respective transistor areas proportional therebetween and the cascade of current mirrors provides a mirror ratio equal to the integer scaling factor N.

11. The voltage regulator device of claim 8, wherein the current generator circuitry comprises a Caprio cell comprising a quadruplet of Caprio cell switches, wherein:

a first Caprio cell switch of the quadruplet of Caprio cell switches in the Caprio cell comprises a first area;

a second Caprio cell switch of the quadruplet of Caprio cell switches in the Caprio cell comprises a unitary area;

a third Caprio cell switch of the quadruplet of Caprio cell switches in the Caprio cell comprises a third area equal to the first area; and a fourth Caprio cell switch of the quadruplet of Caprio cell switches in the Caprio cell comprises a fourth area equal to the unitary area of the second Caprio cell switch of the quadruplet of Caprio cell switches.

12. The voltage regulator device of claim 11, wherein:

the operational amplifier comprises biasing circuitry;

the biasing circuitry comprises a biasing current generator configured to provide a bias current to the operational amplifier; and the biasing current generator is coupled to the current generator circuitry to receive the first current, the biasing current generator comprising a fifth switch coupled to a bias resistive element, wherein the fifth switch has the unitary area.

13. The voltage regulator device of claim 8, wherein the current generator circuitry is configured to produce the first current intensity of the first current expressed as:

$$I_1 = \frac{1}{(1+N)}\frac{\Delta V_{BE}}{R_o}$$

and the second current intensity of the second current expressed as:

$$I_2 = \frac{N}{(1+N)}\frac{\Delta V_{BE}}{R_o}I_1$$

where N is the integer scaling factor, and R0 is the resistance of the second resistive element.

14. The voltage regulator device of claim 8, wherein:

the operational amplifier comprises biasing circuitry; and the biasing circuitry comprises a biasing current generator configured to provide a bias current to the operational amplifier.

15. The voltage regulator device of claim 8, wherein the multiplier circuitry comprises a pair of diode-connected transistors, wherein diode-connected transistors in the pair of diode-connected transistors have a same transistor area.

16. A method, comprising:

generating a startup voltage as a function of a supply voltage received at a supply node;

generating a first current having a first current having a first current intensity and a second current having a second current intensity as a function of the first current intensity;

scaling the second current by an integer scaling factor N;

scaling the second current at a bandgap node to generate a scaled version of the second current with a current intensity scaled by the integer scaling factor N with respect to the first current intensity;

providing a threshold voltage drop across a first transistor node and a second transistor node of a first transistor, the first transistor having a first control node coupled to the first transistor node and to the bandgap node, wherein a first resistive element is interposed between the first transistor and the bandgap node, wherein a second resistive element is coupled between ground and the second transistor node; and providing, at an output node of an operational amplifier, a regulated voltage based on a pre-regulated voltage as a function of a bandgap voltage, the threshold voltage across the first transistor, and a voltage drop across the first resistive element and the second resistive element.

17. The method of claim 16, wherein a startup resistive element is coupled to the supply node.

18. The method of claim 16, wherein the first current intensity of the first current is expressed as:

$$I_1 = \frac{1}{(1+N)}\frac{\Delta V_{BE}}{R_o};$$

and wherein the second current intensity of the second current is expressed as:

$$I_2 = \frac{N}{(1+N)}\frac{\Delta V_{BE}}{R_o}I_1,$$

where N is the integer scaling factor, and R0 is the resistance of the second resistive element.

19. The method of claim 16, further comprising providing a bias current to the operational amplifier.

20. The method of claim 16, wherein the output node of the operational amplifier is coupled to a load, the load being a bandgap circuit, a comparator circuit, or an operational amplifier circuit.

* * * * *